June 11, 1963  K. V. KING ETAL  3,093,764
DYNAMOELECTRIC MACHINE
Filed July 8, 1960
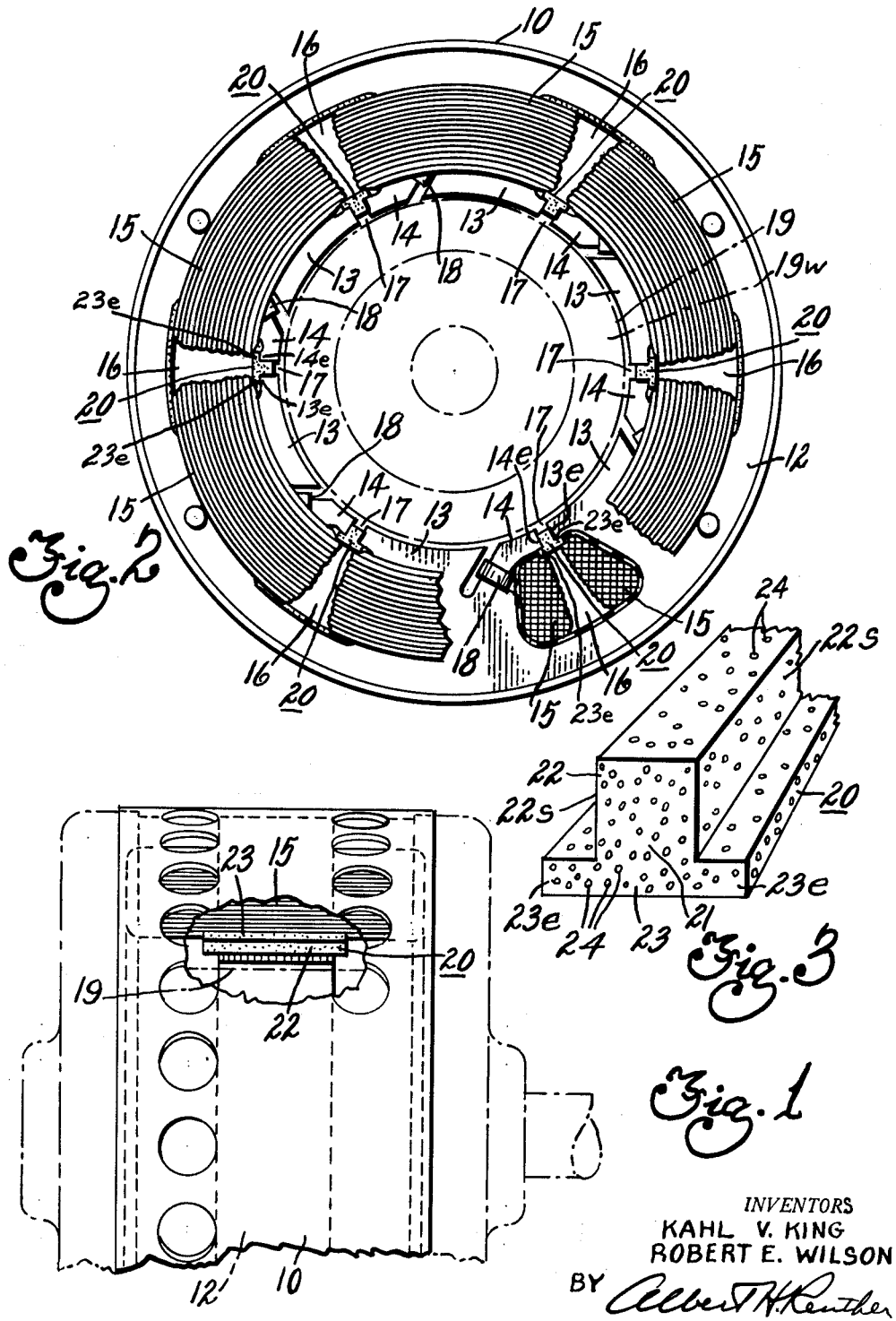
INVENTORS
KAHL V. KING
ROBERT E. WILSON
BY Albert H. Reuther
THEIR ATTORNEY

United States Patent Office 3,093,764
Patented June 11, 1963

3,093,764
DYNAMOELECTRIC MACHINE
Kahl V. King and Robert E. Wilson, Dayton, Ohio, assignors to General Motors Corporation, Detroit, Mich., a corporation of Delaware
Filed July 8, 1960, Ser. No. 41,516
3 Claims. (Cl. 310—214)

This invention relates to dynamoelectric machines and, more particularly, to stator components having magnetic purpose yet made of elastomeric insulating material.

An object of this invention is to provide a new and improved dynamoelectric machine means utilizing an inexpensive extrusion of elastomeric material having metal particles embedded therein wedged between adjacent poles of a stator core.

Another object of this invention is to provide a stator core of a dynamoelectric machine having adjacent poles separated by a slot shared by windings placed therein and closed off by bridge means resiliently wedged in place between edges of the poles for high magnetic flux saturation without danger of noise such as electrical hum as well as mechanical vibration and rattling.

Another object of this invention is to provide in combination, a stator core of sheet metal laminations defining poles between slots fitted with windings and having an elastomeric solid T-shaped magnetic bridge means preferably extruded and made of rubber-like material such as neoprene and the like having metal particles embedded therein which themselves are not magnetized but which are of magnetizable metal to complement a highly saturated magnetic flux path in the stator core without excessive noise such as hum and free of metallic vibration against the poles.

A further object of this invention is to provide a shaded-pole dynamoelectric machine stator assembly including a magnetic core having main and shaded poles formed between slots into which windings are fitted and having elastomeric bridges with a body portion of predetermined cross section of rubber-like material as a carrier for metal particles embedded therein including a deformable portion held in place by jamming and wedging thereof snugly into engagement with spaced-apart edges of adjacent stator teeth or poles for modification of magnetic flux paths while avoiding vibration, rattling and loosening due to any metal to metal contact.

Another object of this invention is to provide a dynamoelectric machine stator assembly including a magnetic core defining poles between slots fitted with windings and having an elastomeric T-shaped magnetic bridge means that has a body portion of rubber-like plastic resin material as a carrier for metal particles embedded therein such that a stem segment of the T-shaped bridge means extends radially inwardly and is deformable to be snugly wedged between spaced edges of adjacent poles and a cross-bar segment integral with the stem segment having opposite ends thereof respectively extending in the direction of turns of adjacent windings which are sufficiently close thereto as to limit space provided for the stem segment ends in between windings and a pre-determined pair of poles.

Further objects and advantages of the present invention will be apparent from the following description, reference being had to the accompanying drawings wherein preferred embodiments of the present invention are clearly shown.

In the drawings:

FIGURE 1 is a partially sectioned side view of a dynamoelectric machine in accordance with the present invention.

FIGURE 2 is a plan view of a stator assembly having elastomeric bridge means in accordance with the present invention.

FIGURE 3 is an enlarged fragmentary view in perspective of elastomeric bridge means fitted to the stator assembly of FIGURE 2.

FIGURES 1 and 2 show a housing 10 in which a magnetic stator core 12 is mounted. The stator core 12 is formed of a plurality of sheet metal laminations having predetermined slots therein and axially aligned relative to each other. Each of the laminations contributes to magnetic main poles 13 a portion of which can serve as a shading pole 14 having an edge 14e spaced a predetermined distance away from an edge 13e of an adjacent main pole. Stator windings 15 include insulated inducting material placed into slots 16 located between the poles. Each of the slots 16 has a radially inwardly extending opening 17 representing an air gap which breaks continuity of a magnetic flux path between corners or ends 13e and 14e of adjacent poles. For starting purposes, a metal band or shorting ring 18 is fitted over each of the shading poles 14 in a well-known manner. In FIGURE 2, there is also an outline of a rotor having a squirrel cage winding 19w cast therewith in a well-known manner.

A dynamoelectric machine stator assembly in accordance with the present invention, includes bridge means generally indicated by numeral 20 and visible both in FIGURES 2 and 3. Previously, metal members have been fitted to magnetic stator cores to close off the air gap or opening 17 so as to provide a continuous metallic flux path for fields of magnetism energized in the metallic core in response to energization in the field windings such as 15 relative to the poles. The shorting rings 18 effect a displacement in phase relationship such that movement of rotor 19 is effected about an axis of a shaft on which the rotor is mounted. However, solid metal closures for the air gaps or slot opening 17 often become loosened and cause undesirable noise such as vibration and rattling in the stator assembly. Without any closure for the air gap or slot opening, there is considerable increase in reluctance and opposition to efficient magnetic flux distribution between and across poles of the stator assembly. Attempts to operate a dynamoelectric machine such as a shaded pole motor at high magnetic flux saturation, results in not only excessive noise such as eletcric hum, but can also have undesirable noise such as vibration and rattling due to metal stator components.

In accordance with the present invention, the bridge means 20 used in combination with the stator assembly has a generally T-shaped body portion 21 provided with an integral stem segment 22 and cross-bar segment 23 having opposite ends 23e spaced a pre-determined distance from each other. The body portion 21 forms a carrier of elastomeric insulating material having rubber-like resilient characteristics and preferably extruded or molded as a continuous longitudinally extending strip in which metal particles 24 are dispersed and embedded. These metal particles themselves are not magnetized but are of magnetizable metal, bonded into place during extrusion and forming of the body portion 21. The insulating material of the body portion 21 can be rubber-like such as neoprene for example and can also be a synthetic plastic resin material having predetermined resilience such as polyester, acetal, as well as vinyl resins and the like. The metal particles 24 are dispersed in the carrier of insulating material so as to be located in the air gap or slot opening 17 due to jamming and wedging of the stem segment 22 snugly into sealing engagement with the edges 13e and 14e of adjacent poles. Each of the stem segments 22 extends radially inwardly toward the center line of a stator assembly or toward the rotor such as 19 and the stem segment 22 has a pair of opposite longitudinally and parallel extending surfaces 22s deformable to complement the magnetic core or lamination edges forming the poles adjacent to each other. When the bridge means are made of metal alone, there is undesirable vibration and noise and similarly when the bridge means are made of rubber or rubber-like material alone, there is excessive hum and noise due to increased reluctance to flow of magnetic force in a continuous path. Provision of elastomeric solid T-shaped magnetic bridge means provides an inexpensive solution to eliminate undesirable noise and vibration encountered in a dynamoelectric machine.

In addition to tight resilient and complementary fit of the deformable surface portion of the stem segments 22, there is a locking and positioning of the opposite ends 23e between the windings 15 and corners 13e and 14e of the main and shading poles respectively. The metal particles 24 embedded in the carrier of insulating material forming the body portion 21 serve to complement a highly saturated magnetic flux path in the stator core without excessive noise such as hum and free of metallic vibration against the poles. The specific combination of the elastomeric bridge means 20 having magnetic particles of material therein to complement a flux path results in better performance and quieter operation of dynamoelectric machine means equipped in accordance with the present invention. Quiet operation is particularly desirable for example when dynamoelectric machines are installed in compact air-conditioning units for driving fans and the like.

While the embodiments of the present invention constitute preferred forms, it is to be understood that other forms might be adopted.

What is claimed is as follows:

1. An improved stator assembly for a dynamoelectric machine comprising, a magnetic core having adjacent substantially radial and full metal poles separated from each other by a slot shared by windings placed therein and having radially inwardly located slot openings between edges of poles, and an extrusion of elastomeric rubber-like material having metal particles embedded therein, said extrusion including a deformable portion that is snugly wedged resiliently against edges directly between adjacent poles of said stator core for high magnetic flux saturation to have only said metal particles complement a magnetic flux path between said edges of said poles without danger of noise such as electrical harmonics hum as well as mechanical vibration and rattling due to any metal to metal contact.

2. The assembly of claim 1 wherein said core includes main and shaded poles having said edges spaced a predetermined distance from each other by an air gap resiliently sealed axially and longitudinally along the slot openings by said deformable portion of said extrusion which has a T-shaped cross section including opposite ends of a stem segment integral with said deformable portion such that said opposite ends are each retained specifically between a pole edge and winding.

3. On a shaded pole dynamoelectric machine stator assembly including a stable magnetic core having main and shaded poles formed substantially radially and fully of metal between slots into which winding means are fitted through radially inwardly extending air-gap openings located intermediate spaced apart edges of adjacent main and shaded poles, the combination therewith of an extrusion composed of metal particles unmagnetized per se as dispersed and embedded in an elastomeric rubber-like material such as neoprene including a substantially T-shaped body portion having a deformable projection integral at one end with a cross-bar segment centrally transverse to said deformable portion, said cross-bar segment having opposite ends integral therewith each to fit for retention specifically between the winding means and one pole edge as the winding means substantially fill each slot, said deformable projection having snug resilient and sealing engagement longitudinally along adjacent pole edges of the stator core for high magnetic flux saturation to have only said unmagnetized metal particles being subject to magnetization only to complement a magnetic flux path laterally across said edges of said poles free of danger of noise such as both electrical harmonics hum as well as mechanical vibration and rattling due to any metal to metal contact.

References Cited in the file of this patent

UNITED STATES PATENTS

| | | |
|---|---|---|
| 2,343,354 | Wolf et al. | Mar. 7, 1944 |
| 2,815,460 | Jones et al. | Dec. 3, 1957 |